United States Patent [19]

Nagano

[11] Patent Number: 4,675,952
[45] Date of Patent: Jun. 30, 1987

[54] MOUNTING STRUCTURE FOR MOUNTING BICYCLE PARTS TO A BICYCLE FRAME

[75] Inventor: Masashi Nagano, Izumi, Japan

[73] Assignee: Shimano Industrial Company Limited, Osaka, Japan

[21] Appl. No.: 727,574

[22] Filed: Apr. 26, 1985

[30] Foreign Application Priority Data

May 1, 1984 [JP] Japan .................................. 59-88911

[51] Int. Cl.[4] ............................................ B62K 23/06
[52] U.S. Cl. ...................................... 24/483; 24/278; 24/484; 74/475; 74/489
[58] Field of Search ................. 24/483, 484, 466, 458, 24/472, 19, 275, 278, 68 BT, 68 C; 403/21, 22; 411/84, 85, 119, 427

[56] References Cited

U.S. PATENT DOCUMENTS

| | | | |
|---|---|---|---|
| 1,047,935 | 12/1912 | Guett | 411/119 X |
| 1,328,813 | 6/1921 | Vitek | 24/278 |
| 2,358,575 | 9/1944 | Hurley | 24/278 |
| 2,392,210 | 1/1946 | Zaleske | 24/278 |
| 2,452,186 | 10/1948 | Fluharty | 24/278 X |
| 2,590,975 | 4/1952 | Juy . | |
| 3,094,366 | 6/1963 | Harmon | 24/278 X |
| 3,105,714 | 10/1963 | Kimber | 24/278 X |
| 3,776,061 | 12/1973 | Yoshigai | 74/480 R |
| 3,915,028 | 10/1975 | Kine | 74/489 X |
| 4,244,235 | 1/1981 | Yoshikawa | 74/489 |
| 4,472,095 | 9/1984 | Molina | 411/427 X |
| 4,486,924 | 12/1984 | Sassak | 24/278 X |

FOREIGN PATENT DOCUMENTS

| | | |
|---|---|---|
| 847701 | 8/1952 | Fed. Rep. of Germany . |
| 3118035 | 2/1982 | Fed. Rep. of Germany . |
| 3201135 | 7/1983 | Fed. Rep. of Germany . |
| 7124074 | 2/1973 | France . |
| 5808 | of 1915 | United Kingdom . |
| 649371 | 1/1951 | United Kingdom ............... 24/278 |
| 2063354 | 6/1981 | United Kingdom ............... 24/484 |

Primary Examiner—Kenneth J. Dorner
Assistant Examiner—Laurie K. Cranmer
Attorney, Agent, or Firm—Stevens, Davis, Miller & Mosher

[57] ABSTRACT

A mounting structure for mounting a bicycle part, such as a front derailleur, to a bicycle frame using a band member. The band member is wound around the bicycle frame and has a pair of mounting legs each having an engaging bore therein. The bicycle part to be mounted includes a base member which includes a receiving bore for the mounting legs. The inner wall of the receiving bore includes cam faces for pushing the mounting legs together as the mounting legs are inserted into the receiving bore to reduce the distance between the mounting legs. A screw tightening member is supported rotatably to the base member and screws with a nut having engaging projections which engage with the engaging bores in the mounting legs when the mounting legs have been inserted a sufficient distance into the receiving bore such that the distance between the mounting legs is less than the distance between the tips of the engaging projections on the nut.

1 Claim, 6 Drawing Figures

MOUNTING STRUCTURE FOR MOUNTING BICYCLE PARTS TO A BICYCLE FRAME

FIELD OF THE INVENTION

This invention relates to a mounting structure for mounting bicycle parts to a bicycle frame, and more particularly, to a mounting structure for fixing a base member at the bicycle part, such as a front derailleur or a lever, to the bicycle frame through a band member brought into press-contact therewith by a tightening member and a nut screwable therewith.

BACKGROUND OF THE INVENTION

Conventionally, a base member of a bicycle part is fixed to the bicycle frame through the band member using a nut prefixed by welding or the like to one of a pair of mounting legs at the band member, or using a nut retained across retaining bores at the mounting legs, so that the mounting legs are inserted into a receiving bore at the base member while keeping the nut retained, and then a tightening member supported rotatably to the base member is screwed with the nut.

One mounting leg, however, when intended to previously fix the nut, must be machined therefor. Also, it is difficult to wind the band member fixedly carrying the nut around the bicycle frame, and the other mounting leg carrying no nut must be aligned exactly with the nut. As a result, the man-hours required for machining are increased and the work efficiency is problematical. On the other hand, mounting legs having a nut retained therebetween, should be inserted into the receiving bore at the base member while keeping the nut retained and then the tightening member screws with the nut, thereby creating a problem in that the man-hours required for assembly increase and the complicated assembly work requires a high degree of skill in the assembly worker.

SUMMARY OF THE INVENTION

In light of the above problem, this invention has been designed. An object of the invention is to provide a mounting structure for mounting bicycle parts to a bicycle frame. Mounting projections or legs at a band member are inserted into a base member of the bicycle part to be mounted, so that the mounting legs are adapted to engage with a nut which screws with a tightening member supported to the base member, thereby enabling the base member to be mounted to the bicycle frame with ease by use of the band member.

In detail, the nut has previously screwed with a threaded shaft of the tightening member, and the mounting legs at the band member, when inserted into the receiving bore at the base member, are made engage with the nut, thereby enabling simple mounting of the base member to the frame.

This invention is characterized in that a mounting structure comprises a band member wound around the bicycle frame, a tightening member having a threaded shaft to bring the band member in press-contact with the bicycle frame, and a nut screwable with the threaded shaft at the tightening member. The band member is provided with a pair of opposite mounting legs each having an engaging bore. The base member is provided with a receiving bore for receiving therein the mounting legs. The receiving bore is provided at its inner wall with cam faces to contract an interval between the mounting legs when the mounting legs are inserted into the receiving bore. The tightening member is supported rotatably to the base member previously screwing with the nut. The nut is provided with engaging projections or ears which with the engaging bores at the mounting legs resepctively when the mounting legs are inserted into the receiving bore and have the interval therebetween reduced by the aforesaid cam faces.

In other words, the cam faces are provided at the inner wall of the receiving bore at the base member, and the mounting legs inserted into the receiving bore are adapted to have an interval between the same forcibly contracted, thereby engaging with the engaging ears at the nut. Thus, the mounting legs are inserted into the receiving bore and the tightening member is rotated in the tightening direction, thereby enabling the base member to be fixed simply to the bicycle frame.

These and other objects of the invention wil become more apparent in the detailed descrition and examples which follow.

DETAILED DESCRIPTION OF THE INVENTION

Figure 1:
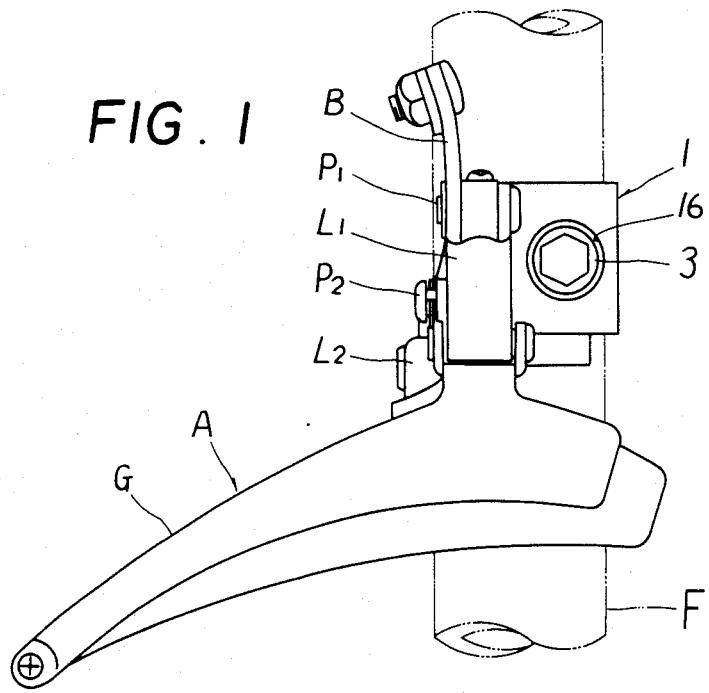
FIG. 1 is a front view illustrating a front derailleur mounted to a bicycle frame.

In the drawings, a mounting structure for mounting a front derailleur A at a bicycle to the bicycle frame is shown, in which the front derailleur A is provided with a base member 1 to be mounted to the bicycle frame. Base member 1 pivotally supports a pair of linkage members $L_1$ and $L_2$ through pins $P_1$ and $P_2$, and a chain guide G is pivoted to the linkage members $L_1$ and $L_2$ through pins (not shown). The linkage member $L_1$ is provided with a fixture B for fixing a control wire (not shown) so that the control wire is operated to actuate the chain guide G through the linkage members $L_1$ and $L_2$ to switch a driving chain from one to another of multistage front chain gears for changing the bicycle speed.

The base member 1, as shown in FIGS. 2 through 5, is block-like-shaped and provided at one side with pin bores 1a and 1b for the pins $P_1$ and $P_2$ supporting the linkage members $L_1$ and $L_2$ and at the other side with a receiving bore 11 extending perpendicularly to the pin bores 1a and 1b and with a support bore 12 in continuation of the receiving bore 11 and for supporting a tightening member 3 to be discussed below.

Figure 2:
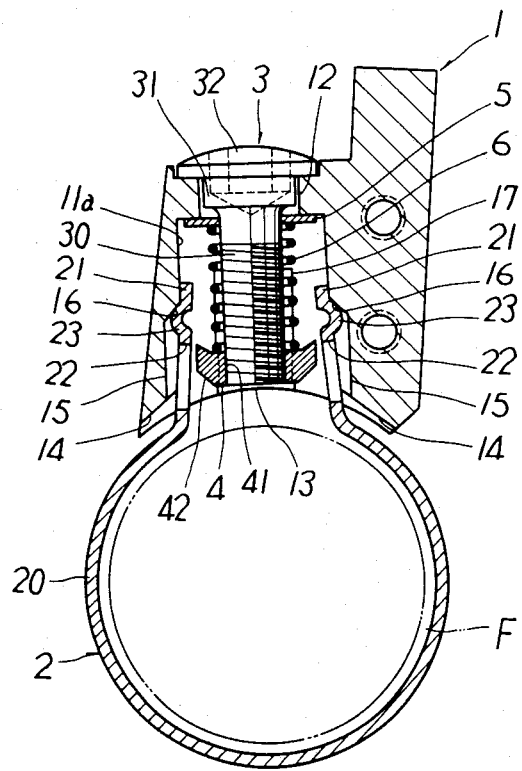
FIG. 2 is a sectional view illustrating insertion of mounting legs of a band member into a base member at the front derailleur.
Figure 3:
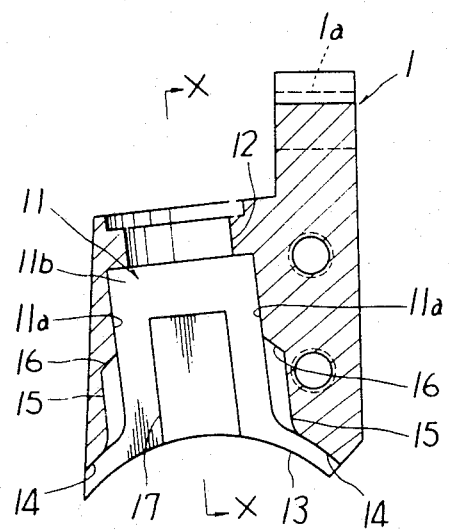
FIG. 3 is a sectional view of the base member.
Figure 4:
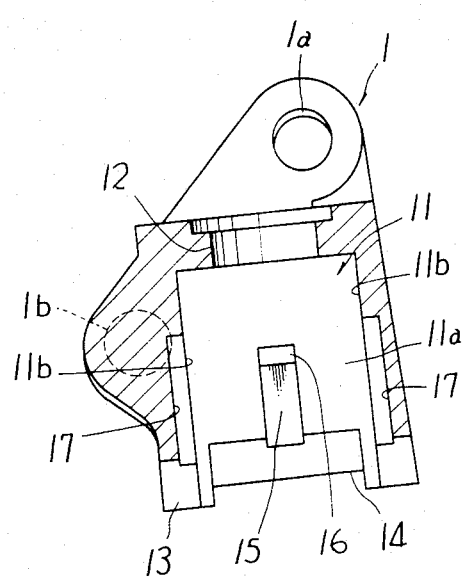
FIG. 4 is a sectional view taken on the line X—X in FIG. 3.
Figure 5:
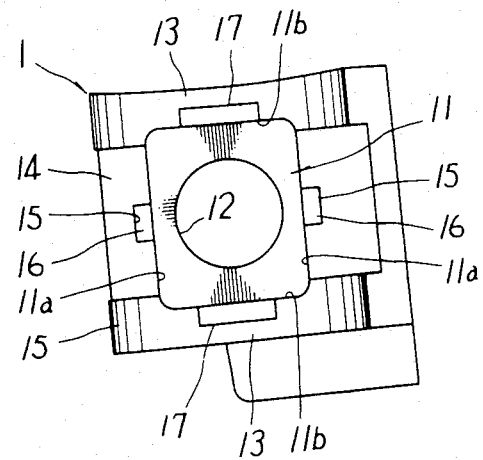
FIG. 5 is a bottom view of the base member in FIG. 3 when viewed from below.

The receiving bore 11, as seen from FIG. 5, is provided with a pair of first opposite inner walls 11a and a pair of second inner walls 11b in continuation thereof, and open downwardly as shown in FIGS. 2 through 4. Second inner walls 11b are recessed at the lower surface 13 in a circular arc along the circular outer periphery of bicycle frame F. First inner walls 11a form at the lower surfaces insertion grooves 14 for a band member 2 to be discussed below.

The mounting structure of the invention is adapted to fix to the bicycle frame F the base member 1 at the front derailleur A by use of the band member 2. Tightening member 3 has a threaded shaft 30 through which the band member 2 is tightened with respect to the frame F and brought into press-contact therewith. Nut 4 is screwable with the threaded shaft 30 of tightening member 3.

The band member 2, as shown in FIG. 2, comprises a band body 20 of a circular arc shape and having both ends. Band body 20 is wound around the frame F and a pair of mounting projections or legs 21 extending radially outwardly from both ends of band body 20, the mounting legs 21 being provided at the roots with engaging bores 22 and at the fore ends with outward protuberances 23. In addition, the protuberances 23 are not particularly indispensable, but allow the mounting legs 21 to be inserted into the receiving bore 11 with ease.

The mounting legs 21 at the band member 2, when not yet inserted into the receiving bore 11, are spaced apart a larger distance than that between the first inner walls 11a at the receiving bore 11, and, when inserted into the receiving bore 11, is adapted to be elastically transformed to contact elastically with the first inner walls 11a respectively.

Also, at the first inner walls 11a of receiving bore 11 at the base member 1 are provided grooves 15 receiving therein the mounting legs 21 and guiding them toward the bottom of receiving bore 11 and cam faces 16 which are positioned at the ends of grooves 12 and contact with the protuberances 23 respectively so as to contact the interval between the mounting legs 21.

Alternatively, the cam faces 16 may be substituted for by swollen portions provided at the first inner walls 11a at the receiving bore 11.

Also, at the second inner walls 11b of receiving bore 11 are provided guide grooves 17 which support the nut 4 not-rotatably but only movably axially of threaded shaft 30.

The tightening member 3 comprises a fitting portion 31 to be fitted rotatably into the support bore 12, a head 32 larger in diameter than the fitting portion 31, and a threaded shaft 30 extending therefrom. Tightening member 3 is supported rotatably to the support bore 12, with the threaded shaft 30 entering into the receiving bore 11 and screwing with the nut 4.

Figure 6:
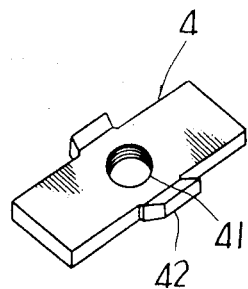
FIG. 6 is a perspective view exemplary of a nut.

The nut 4, as shown in FIG. 6, is rectangular, with a length and width sufficient to enable it to be fitted at both lengthwise ends into the guide grooves 17 respectively. Nut 4 is provided at its center with a threaded bore 41 screwable with the threaded shaft 30 at the tightening member 3 and at both lateral sides of its lengthwise intermediate portion with engaging projections or ears 42 extending outwardly and slantwise forwardly in the insertion direction of mounting legs 21, so that the engaging ears 42 engage with the engaging bores 22 at the mounting legs 21 respectively when inserted into the receiving bore 11 and moved toward each other. Hence, when the tightening member 3 is rotated to screwably move the nut 4 into the receiving bore 11, the mounting legs 21 are moved toward the bottom of receiving bore 11 following the nut 4. In addition, a washer 5 of synthetic resin or the like is provided at the bottom of receiving bore 11 and a spring 6 is interposed between the washer 5 and the nut 4 to thereby prevent the nut 4 from escaping from the tightening member 3.

Next, explanation will be given on the mounting of base member onto the bicycle frame F through the band member 2.

At first, the tightening member 3 is inserted into the receiving bore 11 through the support bore 12 at the base member 1 and is supported rotatably thereto. Nut 4 while being fitted into the guide grooves 17, is disposed at the entrance of receiving bore 11 and screws with the threaded shaft 30. In this condition, the mounting legs 21 of the band member 20, having been wound around the bicycle frame F, are fitted at their protuberances 23 into the grooves 15 respectively and then inserted into the receiving bore 11. Hence, the protuberances 23 contact with the cam faces 16 and ride on the first inner walls 11a respectively to contract the interval between the mounting legs 21, whereby the engaging bores 22 thereof engage with the engaging ears 42 at the nut 4 respectively.

In this condition, the tightening member 3 is rotated to screw nut 4 forwardly so that the mounting legs 21 move toward the bottom of receiving bore 11. Hence, the band member 2 is fitted at the portions thereof located at the mounting leg 21 side of member 2 into the insertion grooves 14 and the base member 1 is brought at lower surface 13 thereof into press-contact with the frame F, thereby being fixed thereto.

Since the nut 4 previously and easily screws with the tightening member 6, the screwing of the nut 4, insertion of mounting legs 21 into the receiving bore 11, and rotation of tightening member 3, provide a structure which can achieve simple mounting of base member 1 to the frame F through the band member 2.

When base member 1 is to be dismounted from the frame F, the tightening member 3 is screwed backwardly and the mounting legs 21 are taken out of the receiving bore 11 so that the nut 4 by itself is disengaged from mounting legs 21. Hence, the base member 1 is dismounted simply and quickly from the frame F.

Alternatively, the band body 20 may be divided into, for example, two members pivotably connected with each other. Also, it is not indispensable that the band body 20, when the mounting legs 21 are inserted into the receiving bore 11, be elastically deformed with the mounting legs 21 elastically contacting with the first inner walls 11a. However, it is preferable that the elastic contact of each mounting leg 21 provide further simplification of engagement thereof with the nut 4. Also, it is preferable that the divided and pivotably connected band body also allows the mounting legs 21 to elastically contact with the inner walls 11a at the receiving bore 11.

In addition, this invention is applicable to an operating device, such as a speed-change lever or a brake lever, as well as the aforesaid front derailleur.

Alternatively, only one of mounting legs 21 may be provided with the engaging bore 22, in which the other leg 21 having no engaging bore is fixed to the nut 4.

Also, each cam face 16 may alternatively be of any shape, such as an arcuate surface.

As seen from the above, in the mounting structure of the invention, the mounting legs at the band member are merely inserted into the receiving bore at the base member with contraction of the interval therebetween so as to automatically contact with the engaging ears of the nut. Hence, the base member is simply mounted to the bicycle frame, thereby improving the efficiency of the base member mounting operation.

Although several embodiments have been described, they are merely exemplary of the invention and not to be construed as limiting, the invention being defined solely by the appended claims.

What is claimed is:

1. A mounting structure in combination with bicycle part to be mounted thereby to a bicycle frame, said bicycle part comprising a base member including a receiving bore having a bore wall including cam means, said mounting structure comprising:
   a band member adapted to be wound around the bicycle frame, said band member including a pair of mounting projections which extend radially outwardly from the band member, said mounting projections being adapted to be inserted into said receiving bore for engagement with said cam means, said cam means reducing a distance between said mounting projections responsive to insertion of said mounting projections into said receiving bore, each of said mounting projections having an engaging bore;
   a tightening means having a threaded shaft, for insertion into said receiving bore and for bringing the band member into press contact with said bicycle frame;
   a nut screwed with the threaded shaft of said tightening means prior to insertion of said mounting projections into said receiving bore, said nut having engaging projections which respectively engage with said engaging bores of said mounting projections in response to said cam means reducing said distance between said mounting projections as said mounting projections are being inserted into said receiving bore; and
   support means for rotatably supporting said tightening means relative to said base member
   wherein said receiving bore comprises a pair of first opposite bore walls and a pair of second bore walls adjacent to said first bore walls respectively, said first bore walls comprising said cam means which include cam faces formed on said respective first bore walls, said second bore walls each having a guide groove for receiving a portion of said nut to keep said nut non-rotatable relative to said base member and to allow said nut to move only axially of said threaded shaft, and wherein said first bore walls each include a groove for receiving therein and guiding a respective said mounting projection, each said groove having at an end portion thereof a said cam face.

* * * * *